(12) United States Patent
Kittaka

(10) Patent No.: US 6,330,116 B1
(45) Date of Patent: Dec. 11, 2001

(54) OPTICS USING A GRADIENT INDEX LENS

(75) Inventor: Shigeo Kittaka, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/525,519

(22) Filed: Mar. 15, 2000

(30) Foreign Application Priority Data

Mar. 19, 1999 (JP) .................................................. 11-075393

(51) Int. Cl.$^7$ ........................................................ G02B 3/00
(52) U.S. Cl. ........................................... 359/654; 359/793
(58) Field of Search ................................... 359/654, 653, 359/652, 793, 794, 795

(56) References Cited

U.S. PATENT DOCUMENTS

| | | | |
|---|---|---|---|
| 4,783,154 | 11/1988 | Takahashi | 359/654 |
| 4,852,981 | 8/1989 | Suda | 359/654 |
| 5,619,488 | 4/1997 | Ota et al. | 369/112.26 |
| 5,949,585 | * 9/1999 | Kittaka | 359/654 |

OTHER PUBLICATIONS

Patent Abstracts of Japan, vol. 1999, No. 11, Japanese Publication 11–149038, Jun. 2, 1999.
Patent Abstracts of Japn, vol. 1998, No. 02, Japanese Publication 09–281388, Oct. 31, 1997.

\* cited by examiner

*Primary Examiner*—Scott J. Sugarman
(74) *Attorney, Agent, or Firm*—McGuireWoods LLP

(57) ABSTRACT

Objective lens optics that can realize NA higher than 1.623 without suffering from increased aberrations and which can be manufactured in a sufficiently smaller size to be suitable for use in an optical head on optical disk systems. The optics is made up of the combination of a single gradient index lens (1) having a gradient refractive index in a radial direction thereof and a single planoconvex lens (2) having a homogeneous refractive index. The gradient index lens has a planar or convexospherical lens surface. The planoconvex lens is made of a material whose refractive index (n) is greater than 2.2; it has its convex surface opposed to the gradient index lens such that the optical axes of the two lenses are aligned. Typically, the gradient index lens is provided on the object side and the planar surface of the planoconvex lens on the image side to make the optics suitable for use as an objective lens in optical heads.

9 Claims, 12 Drawing Sheets

OPTICS USING A GRADIENT INDEX LENS

CROSS REFERENCE TO RELATED APPLICATION

This application is related to U.S. patent application Ser. No. 09/414,073 filed on Oct. 7, 1999, herein incorporated by reference.

BACKGROUND OF THE INVENTION

The present invention relates to optics comprising the combination of a single gradient index lens and a single planoconvex lens. More particularly, the invention relates to optics whose numerical aperture (NA) can be increased by combining the two lenses in such a way that the convex surface of the planoconvex lens is opposed to one of the two lens surfaces of the gradient index lens with little or no gap left between the lenses. The optics of the invention is useful as an objective lens in optical heads for reading information recorded on optical disks or writing new information onto optical disks.

Optical disk systems such as a compact disk apparatus and a DVD apparatus use an optical head with which information is read from or written to a recording medium by illuminating the recording surface with laser light that has been condensed with an objective lens to form a beam spot. To increase the density of recording on the medium, the diameter of the beam spot has to be reduced and, to this end, the objective lens desirably has an increased NA on the image side. From the viewpoint of shortening the playback and access times, reduction in size and weight is also important.

Under these circumstances, a plastic aspherical lens having a NA of about 0.45 is conventionally used as an objective lens in compact disk apparatus whereas a glass molded aspherical lens having a NA of about 0.60 is used as an objective lens in DVD apparatus.

In order to further reduce the size of recording apparatus that use optical disks, the objective lens itself has to be made further compact. However, aspherical lenses are manufactured by press working on a die and it is extremely difficult to make tiny lenses having an outside diameter of 1 mm or less (see "Bishokogaku Handobukku (Handbook of Microoptics)", ed. by the Society of optics of Japan, 1995, p. 6).

An example of imaging optics having an outside diameter of 1 mm or less is a rod lens having a gradient refractive index in its radial direction. The gradient refractive index in radial direction of the rod lens is typically represented by the following equation:

$$n(r)^2 = n_0^2 \cdot \{1 - (g \cdot r)^2 + h_4(g \cdot r)^4 + h_6(g \cdot r)^6 + h_8(g \cdot r)^8 + \ldots\}$$

where r: the distance from the optical axis n(r): the refractive index at distance r from the optical axis $n_0$: the refractive index on the optical axis $r_0$: the radius of the gradient index lens g: the second order gradient index coefficient $h_4, h_6, h_8, \ldots$: a higher order gradient index coefficient.

This gradient index lens is typically manufactured by applying the ion-exchange technology to rod-shaped glass and has the advantage that small-diameter (o.d. $\leq 1$ mm) lenses can be produced at low cost. In addition, the lens material itself has a positive refractive power, so even a lens of a simple rod shape which is planar on both sides can be used as an objective lens. The refractive power of a gradient index lens is expressed as $n_0 \cdot g \cdot r_0$ and the greater its value, the higher the NA of the objective lens that can be produced. However, there is a limit on the difference in refractive index that can be attained by the ion-exchange technology and the value of $n_0 \cdot g \cdot r_0$ that can be realized by the ordinary ion-exchange technology is no more than about 0.70.

Comparative Example 1 to be described later in this specification is optics using only a gradient index lens having $n_0 \cdot g \cdot r_0 = 0.68$ and it gives NA=0.629 on the image side.

However, to realize a higher recording density, the development of objective lens optics having an even greater NA is desired. On the other hand, lenses with high NA are generally prone to experience large aberrations and a certain measure must be taken to reduce them. There also exists the need to reduce the size and weight of the optics in order to make the recording apparatus compact and increase the access speed.

Under these circumstances, the present inventors previously proposed optics useful as an objective lens characterized by the combination of a single gradient index lens and a single planoconvex lens (see Japanese Patent Application No. 203244/1998). The optics was designed on the assumption of using optical glass in the planoconvex lens and it could provide NA of 1.623 on the image side (Comparative Example 2 to be described later in this specification). The proposed objective lens optics has very good optical characteristics. However, the advances in digital recording technology are remarkable and there is a constant need for objective lens optics having even greater values of NA.

SUMMARY OF THE INVENTION

An object of the invention is to provide optics that can realize NA higher than 1.623 without suffering from increased aberrations and which can be manufactured in a sufficiently smaller size to be suitable for use as an objective lens.

The present invention attains this object by optics that uses a gradient index lens comprising the combination of a single gradient index lens having a gradient refractive index in a radial direction thereof and a single planoconvex lens having a homogeneous refractive index, (1) the gradient index lens having a planar or convexo-spherical lens surface, with its gradient refractive index being expressed as $$n(r)^2 = n_0^2 \cdot \{1 - (g \cdot r)^2 + h_4(g \cdot r)^4 + h_6(g \cdot r)^6 + h_8(g \cdot r)^8 + \ldots\}$$

where $1.45 \leq n_0 \leq 1.80$ $0.45 \leq n_0 \cdot g \cdot r_0 \leq 0.90$ provided that r: the distance from the optical axis n(r): the refractive index at distance r from the optical axis $n_0$: the refractive index on the optical axis $r_0$: the radius of the gradient index lens g: the second order gradient index coefficient $h_4, h_6, h_8, \ldots$: a higher order gradient index coefficient;

(2) the planoconvex lens being opposed to the gradient index lens such that its optical axis aligns with the optical axis of the gradient index lens and that it satisfies the following condition:

$$2.2 < n$$

where n: the refractive index of the planoconvex lens.

As used in the specification, the "radius $r_0$ of the gradient index lens" means the radius of that portion of the lens which effectively works as a focusing lens. This may be defined as the "range in which the RMS wave front aberration on the optical axis is no more than $0.07\lambda$". The radius $r_0$ of the gradient index lens affects its refractive power and hence serves as a numerical reference in design. In practice, however, there are many cases where the peripheral portion of a manufactured gradient index lens is widely offset from the design value of gradient refractive index and fails to provide the intended lens action. Take, for example, a gradient index lens having a nominal outside diameter of 1 mm; the effective portion of the lens which provides the intended lens action may be 0.8 mm in diameter. In this case, $r_0$ is 0.4 mm.

From an assembling viewpoint, one of the two lens surfaces of the gradient index lens is desirably in contact with the convex surface of the planoconvex lens but, in practice, a slight gap may exist between the lenses without compromising the optical performance of the optics. Typically, the gradient index lens is provided on the object side and the planar surface of the planoconvex lens on the image side and the resulting optics can be used as an objective lens. Conversely, the planar surface of the planoconvex lens may be provided on the object side and the gradient index lens on the image side to make the optics suitable for use as a condensing lens or a collimator.

The gradient index lens used in the invention is so designed that its on-axis refractive index no is between 1.45 (inclusive) and 1.80 (inclusive) and this defines the range over which the lens can be practicably manufactured by ion-exchange and other techniques. The value of $n_0 \cdot g \cdot r_0$ which corresponds to refractive power is adjusted to lie between 0.45 (inclusive) and 0.90 (inclusive). Below the lower limit 0.45, sufficiently high NA cannot be obtained. Values in excess of 0.90 are more than the upper limit of differential refractive index that can be attained by the ion-exchange technology and given future improvements in glass composition, it is extremely difficult to manufacture gradient index lenses with $n_0 \cdot g \cdot r_0$ values greater than 0.90. Remember that the upper limit that can be readily attained by the current ion-exchange technology is about 0.70.

The radius $r_0$ of the gradient index lens is desirably within the range of from 0.05 mm (inclusive) to 0.5 mm (inclusive). For making the overall optics more compact than is achievable by the prior art, $r_0$ should not be greater than 0.5 mm. A lens having $r_0$ less than 0.05 mm is extremely difficult to manufacture. From the viewpoint of making a compact and lighter optics, a more preferred range is from 0.05 mm (inclusive) to 0.3 mm (inclusive).

In the present invention, the spherical aberration of the overall optics is corrected by higher order gradient index coefficients $h_4, h_6, h_8, \ldots$. For the sake of simplicity, let the terms of $h_6$ and higher orders be zero and approximate the gradient refractive index of the gradient index lens by $$n(r)^2 = n_0^2 \cdot \{1 - (g \cdot r)^2 + h_4(g \cdot r)^4\}$$

The value of $h_4$ is desirably in the range from −3 (inclusive) to 3 (inclusive). A gradient index lens with $h_4$ of less than −3 or greater than 3 is extremely difficult to manufacture.

In the present invention, an increased value of NA is realized by combining the refractive index lens with a planoconvex lens of high refractive index. If the convex surface of the planoconvex lens is directed toward the gradient index lens and its planar surface to the image side, a shape resembling a so-called "aplanatic lens" is created to prevent the increase in spherical aberration. The convex surface of the planoconvex lens may be rendered aspherical to be of some help in correcting aberrations, however, from the viewpoint of lens manufacture, a simple spherical surface is desired.

In ordinary optical disk systems (e.g. compact disk apparatus and DVD apparatus), the focal position on image side of the optics is provided in the space closer to the recording medium. If desired, the focal position may coincide with the planar surface of the planoconvex lens. In this alternative case, the NA at the focal point is expressed as $$NA = n \cdot \sin\theta$$

where $\theta$: the divergence angle of condensed rays n: the refractive index of the planoconvex lens.

If $\theta$ remains the same, a greater value of NA is attained than in air (n=1), eventually producing a smaller beam spot.

Thus, a recording film as on a magneto-optical disk is placed in close vicinity to the focal position (in a proximal field area not more than a quarter of the wavelength of the light source) and the "smear" of light from the beam spot of the same diameter is effectively used to achieve recording at a higher density. This is a technique commonly called "proximal field recording" and the optics of the invention is also applicable to this recording technique. In the proximal field recording, the greater the refractive index, the better.

Another feature of the present invention is that the refractive index n of the planoconvex lens is smaller than 2.2. This condition is necessary to permit the use of semiconductors and compounds as lens materials. Table 1 lists exemplary materials having refractive indices smaller than 2.2.

TABLE 1

| Name | Refractive index $\lambda$ in parentheses) | Remarks | Source |
|---|---|---|---|
| Si | 3.43 (3 $\mu$m) | | a |
| Diamond | 2.42 (0.6 $\mu$m) | | a |
| TiO$_2$ | 2.61, 2.90 (0.6 $\mu$m) | birefringent | a |
| SrTiO$_3$ | 2.40 (0.6 $\mu$m) | | a |
| ZnS | 2.37 (0.6 $\mu$m) | | a |
| ZnTe | 3.05 (0.6 $\mu$m) | | a |
| GaP | 3.35 (0.6 $\mu$m) | | a |
| GaAs | 3.42 (1 $\mu$m) | | a |
| InP | 3.37 (0.6 $\mu$m) | | a |
| InAs | 3.4 (0.6 $\mu$m) | | a |
| InSb | 3.75 (0.6 $\mu$m) | | a |
| Ge | 4.102 (2.06 $\mu$m) | | b |
| GaSb | 3.82 | | c |
| AlP | 3.03 | | c |
| AlAs | 3.18 | | c |
| AlSb | 3.79 | | c | a: "Hikarikogaku Handobukku (Handbook of Optical Engineering)", published by Asakura Shoten, 1986, p. 306 ff.
b: "Oyobunkogaku Handobukku (Handbook of Applied Spectroscopy)", ed. by H. Yoshinaga, published by Asakura Shoten, 1973, p. 250 ff.
c: "Bishokogaku Handobukku (Handbook of Microoptics)", ed. by the Japan Society of Applied Physics and the Society of Optics of Japan, published by Asakura Shoten, 1995, p. 224.

a: "Hikarikogaku Handobukku (Handbook of Optical Engineering)", published by Asakura Shoten, 1986, p. 306 ff.

b: "Oyobunkogaku Handobukku (Handbook of Applied Spectroscopy)", ed. by H. Yoshinaga, published by Asakura Shoten, 1973, p. 250 ff.

c: "bishokogaku Handobukku (Handbook of nicrooptics)", ed. by the Japan Society of Applied Physics and the Society of Optics of Japan, published by Asakura Shoten, 1995, p. 224.

In the case of a birefringent material such as $TiO_2$ in Table 1, only light in a specified polarized plane is desirably used and this can be created by a polarizing filter or some other suitable means. Among the materials listed in Table 1, Ge has a refractive index in excess of 4.1 at a wavelength of 2 μm or below and, hence, the refractive index of the planoconvex lens is desirably adjusted to lie within the range from 2.2 (inclusive) to 4.2 (inclusive).

The radius of curvature R of the planoconvex lens is desirably in the range from $0.2r_0$ (inclusive) to $1.0r_0$ (inclusive). If R is smaller than $0.2r_0$, difficulty is encountered in making a unitary assembly by combining the planoconvex lens with the gradient index lens. If R is greater than $1.0r_0$, the intended effect for providing higher NA cannot be attained.

The radius of the planoconvex lens is desirably adjusted to be comparable to or smaller than that of the gradient index lens with which it is combined. Stated specifically, the radius of the planoconvex lens is desirably not more than 0.5 mm from the viewpoint of realizing compact optics. By grinding and polishing a part of mass-producible ball lenses, small-diameter planoconvex lenses can be manufactured at low cost even if they are generally hemispherical.

The present disclosure relates to the subject matter contained in Japanese patent application No. Hei. 11-75393 (filed on Mar. 19, 1999), which is expressly incorporated herein by reference in its entirety.

DESCRIPTION OF THE PREFERRED EMBODIMENT

Figure 1A:
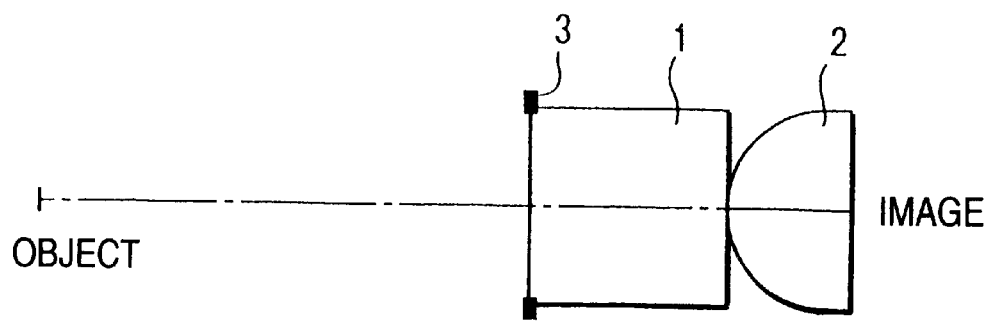
FIG. 1 illustrates the lens configuration of Example 1 and the on-axis aberrations it develops.
Figure 1B:
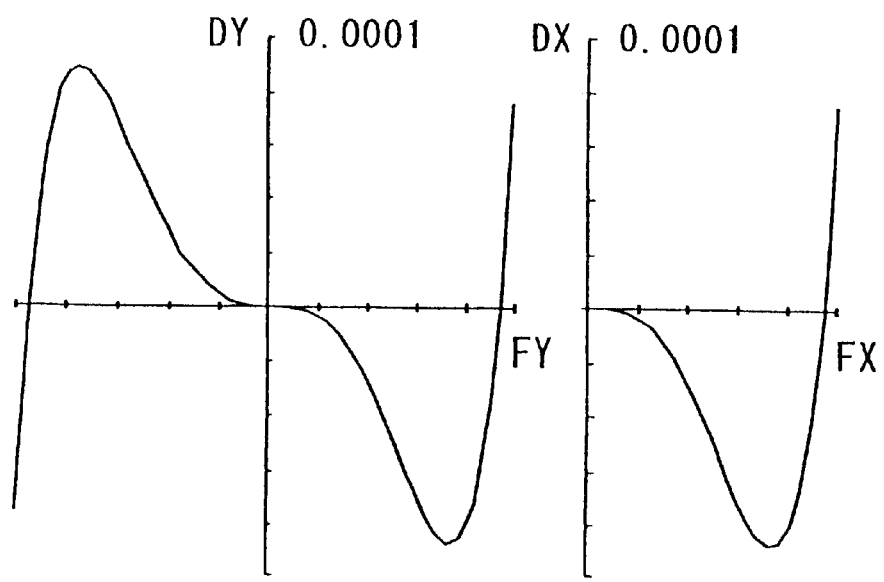
Figure 2A:
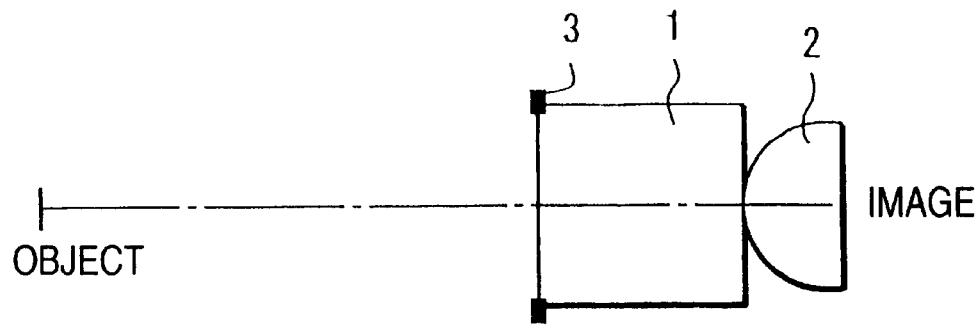
FIG. 2 illustrates the lens configuration of Example 2 and the on-axis aberrations it develops.
Figure 2B:
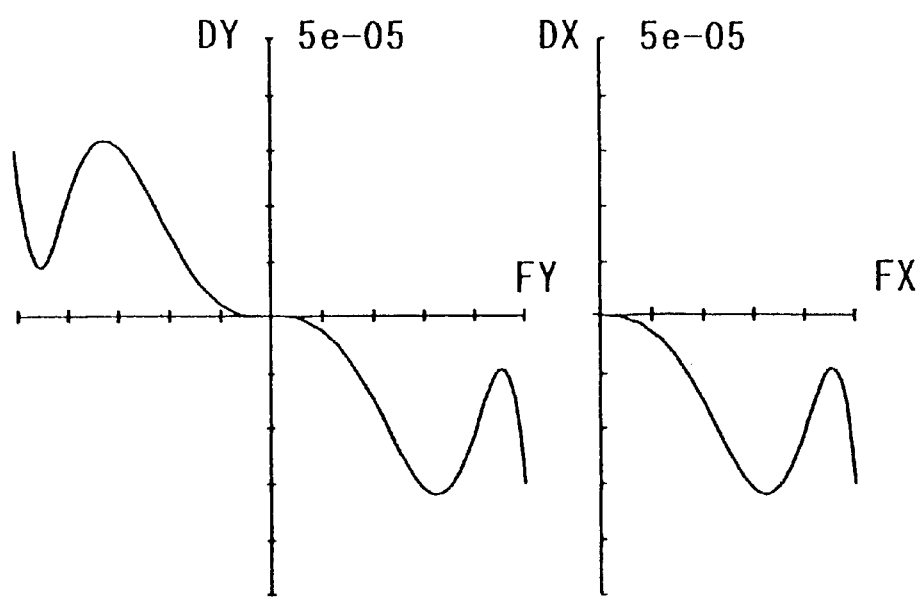
Figure 3A:
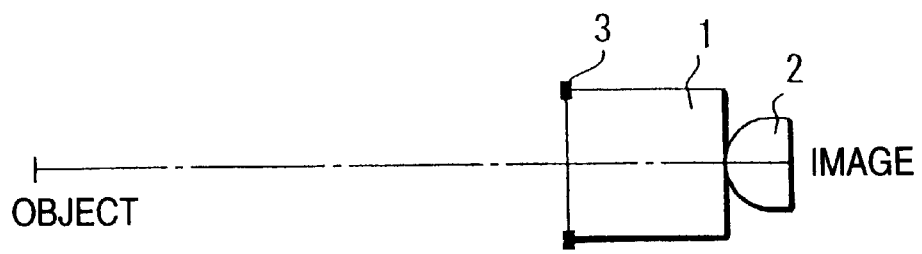
FIG. 3 illustrates the lens configuration of Example 3 and the on-axis aberrations it develops.
Figure 3B:
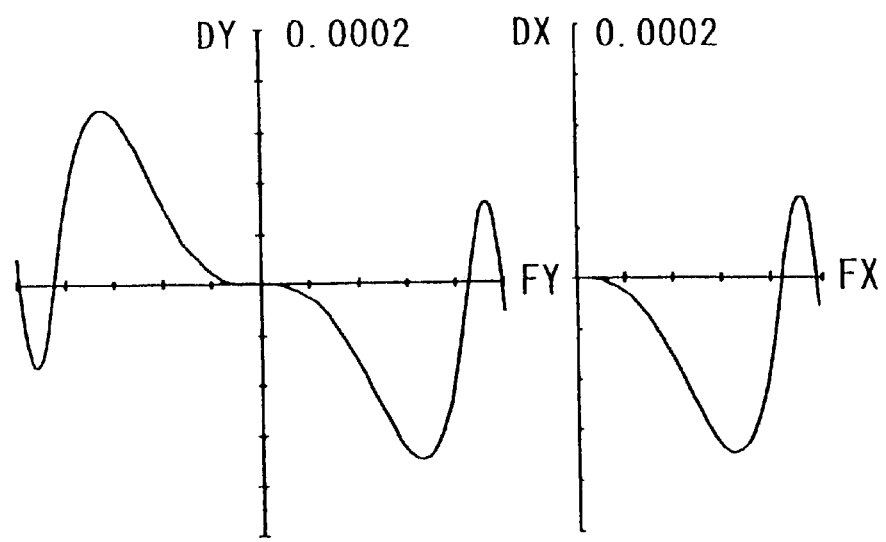
Figure 4A:
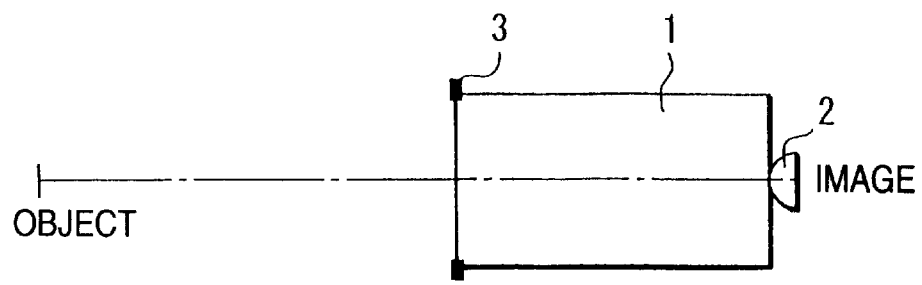
FIG. 4 illustrates the lens configuration of Example 4 and the on-axis aberrations it develops.
Figure 4B:
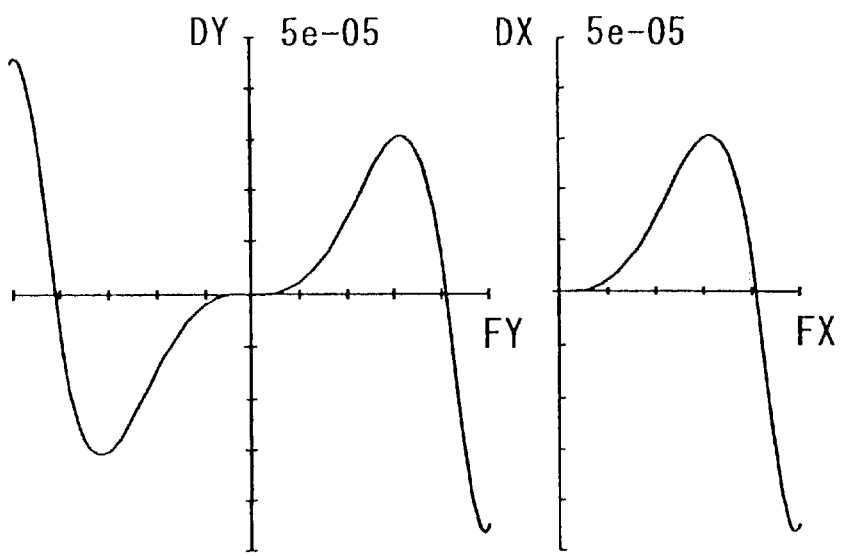
Figure 5A:
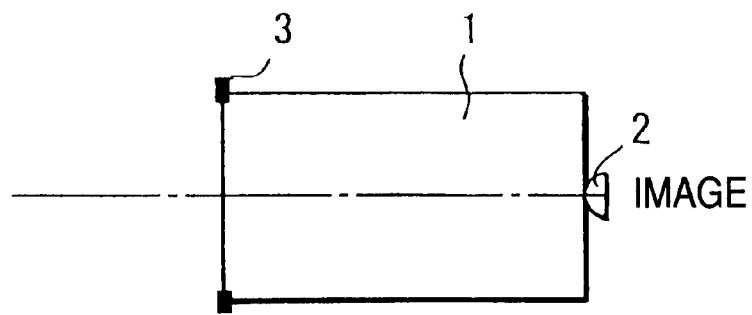
FIG. 5 illustrates the lens configuration of Example 5 and the on-axis aberrations it develops.
Figure 5B:
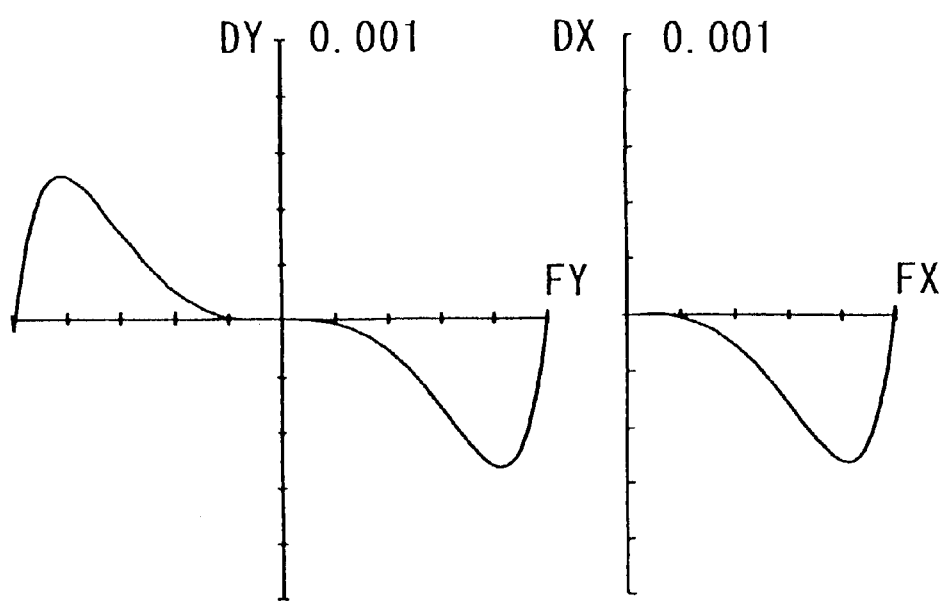
Figure 6A:
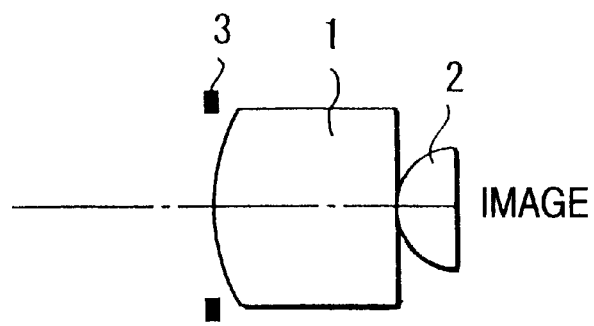
FIG. 6 illustrates the lens configuration of Example 6 and the on-axis aberrations it develops.
Figure 6B:
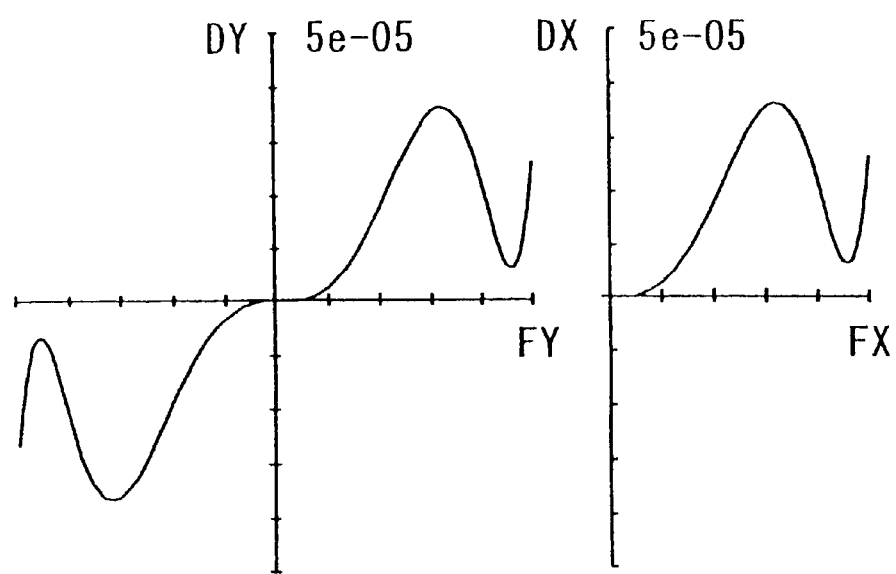
Figure 7A:
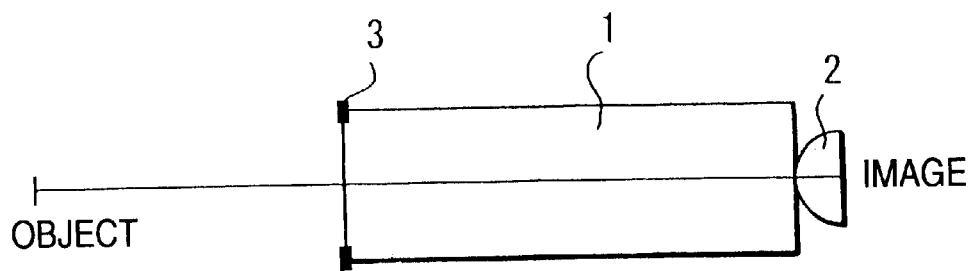
FIG. 7 illustrates the lens configuration of Example 7 and the on-axis aberrations it develops.
Figure 7B:
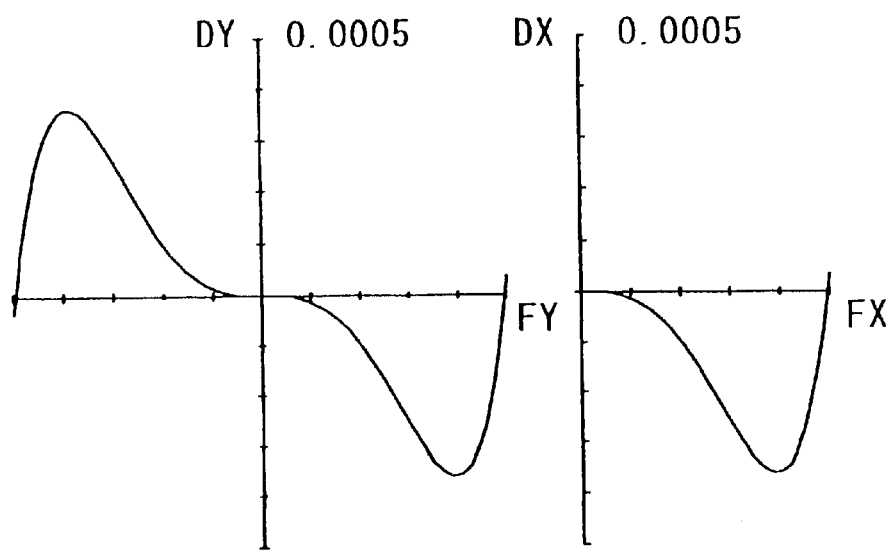
Figure 8A:
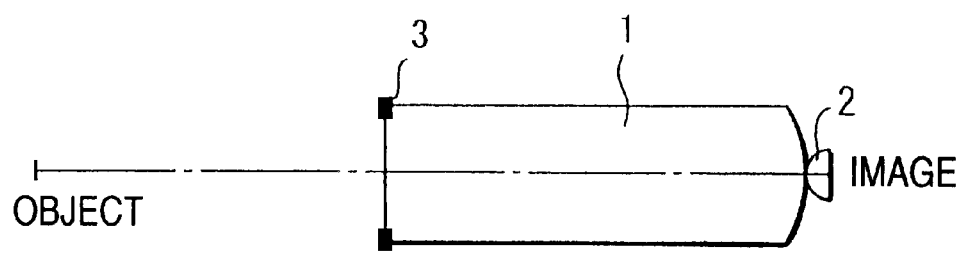
FIG. 8 illustrates the lens configuration of Example 8 and the on-axis aberrations it develops.
Figure 8B:
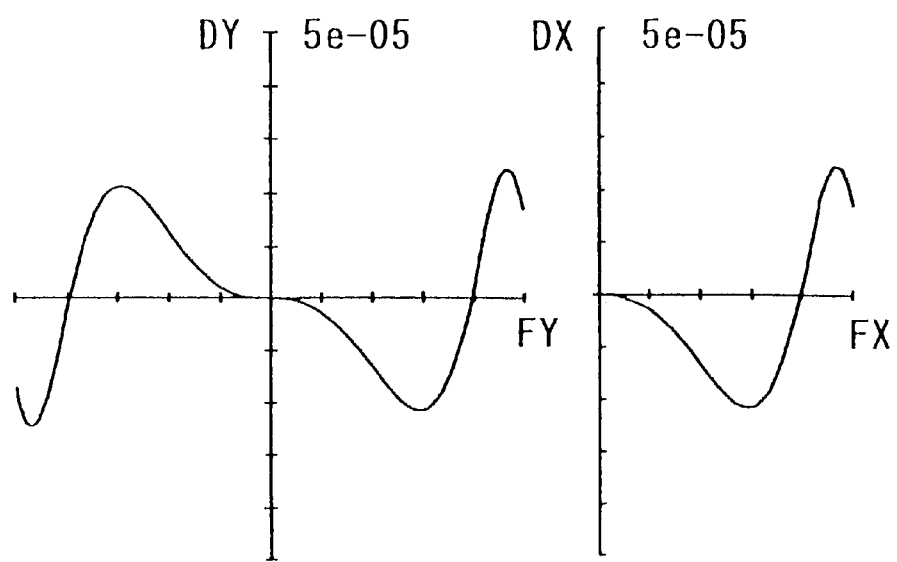
Figure 9A:
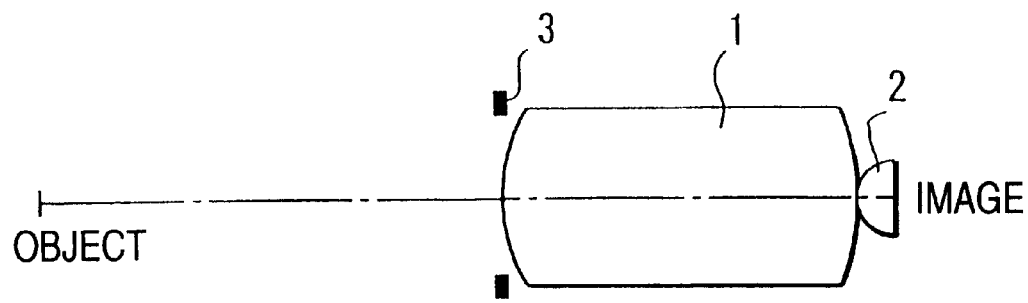
FIG. 9 illustrates the lens configuration of Example 9 and the on-axis aberrations it develops.
Figure 9B:
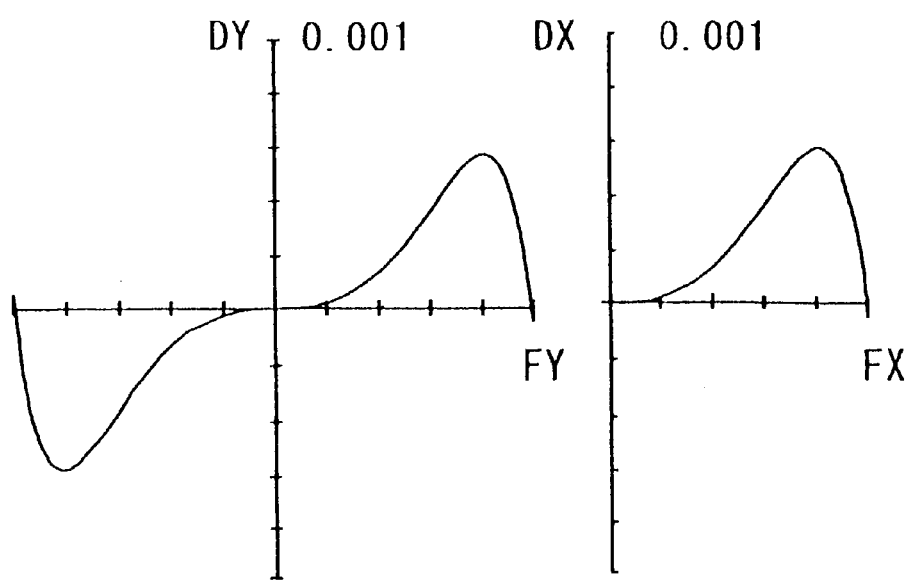
Figure 10A:
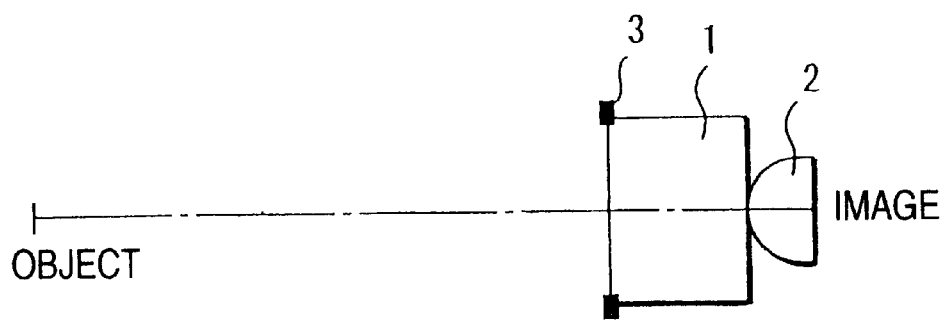
FIG. 10 illustrates the lens configuration of Example 10 and the on-axis aberrations it develops.
Figure 10B:
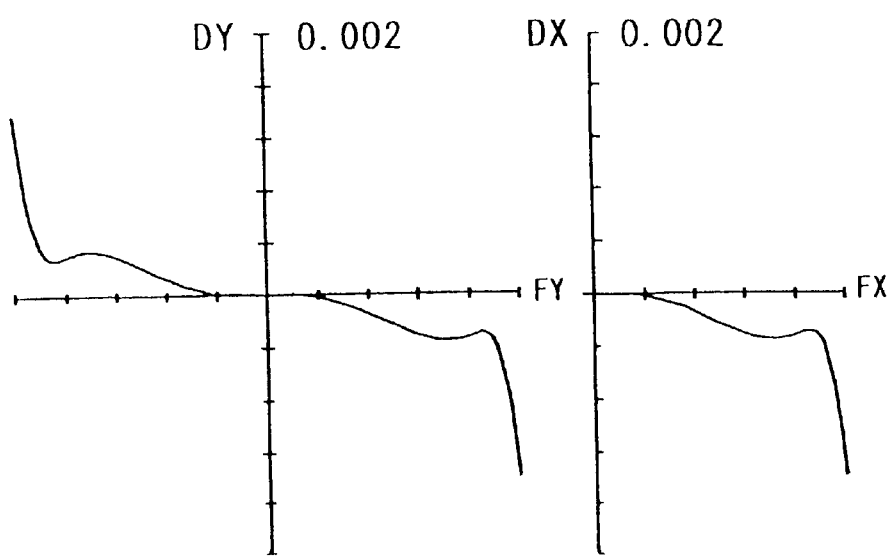

The gradient index lens to be used in the invention may assume various shapes; for example, both lens surfaces may be planar; either one of the two lens surfaces may be planar and the other lens surface is convexospherical; or both lens surfaces may be convexospherical. Working on at least one lens surface of the gradient index lens to render it spherical has the advantage of providing a greater refractive power and, hence, a higher NA value.

In a typical embodiment of the invention, one of the two lens surfaces of the gradient index lens is opposed to the convex surface of the planoconvex lens and the other lens surface of the gradient index lens is opposed to a light source, with a focused image being created in the planar surface of the planoconvex lens, which is opposed to a recording medium as spaced by a very small gap not greater than the wavelength of light.

The present discussion assumes the use of a light source such as a laser that emits monochromatic light. The wavelength λ of the light source is desirably in the range from 0.3 μm to 2.0 μm. Below 0.3 μm, the transmittance of the gradient index lens is considerably deteriorated; above 2.0 μm, the spot diameter at the focal point becomes so great as to lower the recording density. Needless to say, the wavelength of the light from the light source must be sufficiently long that it adequately passes through the planoconvex lens material.

Examples

The design values for examples of the invention and those for comparative examples are shown below in Tables 2–4 after being normalized against the radius $r_0$ of the refractive index lens. In practice, the radius $r_0$ of the gradient index lens is within the range of 0.05 mm–0.5 mm. Take, for example, the case where $r_0$ is 0.2 mm. To obtain design values of an actual lens from the data listed in Tables 2–4, multiply the distance from the object (light source) to the gradient index lens, the radius of the aperture diaphragm, the radius of the gradient index lens, its radius of curvature on the object side, the thickness of the gradient index lens, its radius of curvature on the image side, the distance between the two lenses, the radius of curvature of the planoconvex lens, its thickness and the distance from the planoconvex lens to the image plane (the recording surface of an optical disk) by a factor of 0.2 (in millimeters) but multiply the second order gradient refractive index coefficient g by a factor of 1/0.2 (in mm$^{-1}$).

The values of $n_0$ (the on-axis refractive index), $n_0 \cdot g \cdot r_0$, $h_4$ (the fourth order gradient refractive index coefficient), n (the refractive index of the planoconvex lens) and NA on image side are dimensionless and, hence, invariable.

TABLE 2

|  | Ex. 1 | Ex. 2 | Ex. 3 | Ex. 4 |
| --- | --- | --- | --- | --- |
| Distance from object to gradient index lens | 5.00 | 5.00 | 7.00 | 5.00 |
| Radius of aperture diaphragm | 0.95 | 0.95 | 0.95 | 0.95 |
| Radius of gradient index lens, $r_0$ | 1.000 | 1.000 | 1.000 | 1.000 |
| Radius of curvature on object side of gradient index lens | planar surface | planar surface | planar surface | planar surface |
| On-axis refractive index, $n_0$ | 1.64 | 1.80 | 1.80 | 1.80 |
| Second-order gradient index coefficient, g | 0.400 | 0.388 | 0.388 | 0.388 |
| $n_0 \cdot g \cdot r_0$ | 0.656 | 0.698 | 0.698 | 0.698 |
| Fourth-order gradient index coefficient, $h_4$ | 0.320 | 0.246 | 0.476 | 0.552 |
| Thickness of gradient index lens | 2.063 | 2.079 | 2.072 | 3.709 |
| Radius of curvature on image side of gradient index lens | planar surface | planar surface | planar surface | planar surface |
| Distance between lenses | 0 | 0 | 0 | 0 |

TABLE 2-continued

|  | Ex. 1 | Ex. 2 | Ex. 3 | Ex. 4 |
|---|---|---|---|---|
| Refractive index of planoconvex lens | 3.03 | 3.79 | 2.42 | 4.10 |
| Radius of curvature of planoconvex lens, R | 1.000 | 0.800 | 0.600 | 0.300 |
| Thickness of planoconvex lens | 1.2553 | 0.9731 | 0.8501 | 0.3435 |
| Distance from planoconvex lens to image plane | 0 | 0 | 0 | 0 |
| NA on image side | 1.888 | 2.909 | 2.162 | 3.574 |

TABLE 3

|  | Ex. 5 | Ex. 6 | Ex. 7 | Ex. 8 |
|---|---|---|---|---|
| Distance from object to gradient index lens | infinity | infinity | 4.00 | 5.00 |
| Radius of aperture diaphragm | 1.00 | 1.00 | 0.885 | 0.91 |
| Radius of gradient index lens, $r_0$ | 1.000 | 1.000 | 1.000 | 1.000 |
| Radius of curvature on object side of gradient index lens | planar surface | 2.000 | planar surface | planar surface |
| On-axis refractive index, $n_0$ | 1.70 | 1.70 | 1.64 | 1.55 |
| Second-order gradient index coefficient, g | 0.388 | 0.350 | 0.300 | 0.300 |
| $n_0 \cdot g \cdot r_0$ | 0.660 | 0.595 | 0.492 | 0.465 |
| Fourth-order gradient index coefficient, $h_4$ | 0.696 | 0.0857 | 0.630 | 0.650 |
| Thickness of gradient index lens | 3.469 | 1.815 | 5.8463 | 6.054 |
| Radius of curvature on image side of gradient index lens | planar surface | planar surface | planar surface | −2.000 |
| Distance between lenses | 0 | 0 | 0 | 0 |
| Refractive index of planoconvex lens | 3.43 | 3.42 | 3.75 | 3.82 |
| Radius of curvature of planoconvex lens, R | 0.200 | 0.600 | 0.600 | 0.350 |
| Thickness of planoconvex lens | 0.2281 | 0.6303 | 0.600 | 0.3411 |
| Distance from planoconvex lens to image plane | 0 | 0 | 0 | 0 |
| NA on image side | 2.752 | 2.254 | 1.699 | 1.796 |

TABLE 4

|  | Ex. 9 | Ex. 10 | Comp. Ex. 1 | Comp. Ex. 2 |
|---|---|---|---|---|
| Distance from object to gradient index lens | 5.00 | 6.00 | 5.20 | 6.00 |
| Radius of aperture diaphragm | 0.95 | 0.980 | 0.95 | 0.98 |
| Radius of gradient index lens, $r_0$ | 1.000 | 1.000 | 1.000 | 1.000 |
| Radius of curvature on object side of gradient index lens | 2.00 | planar surface | planar surface | planar surface |
| On-axis refractive index, $n_0$ | 1.55 | 1.75 | 1.70 | 1.682 |
| Second-order gradient index coefficient, g | 0.300 | 0.514 | 0.400 | 0.440 |
| $n_0 \cdot g \cdot r_0$ | 0.465 | 0.899 | 0.680 | 0.740 |
| Fourth-order gradient index coefficient, $h_4$ | 0.860 | 0.239 | 0.600 | 0.400 |
| Thickness of gradient index lens | 3.925 | 1.453 | 4.217 | 1.5316 |
| Radius of curvature on image side of gradient index lens | −3.30 | planar surface | planar surface | planar surface |
| Distance between lenses | 0 | 0 | — | 0 |
| Refractive index of planoconvex lens | 3.35 | 3.35 | — | 2.20 |
| Radius of curvature of planoconvex lens, R | 0.400 | 0.550 | — | 0.800 |
| Thickness of planoconvex lens | 0.4188 | 0.6920 | — | 1.1828 |
| Distance from planoconvex lens to image plane | 0 | 0 | 0.235 | 0 |
| NA on image side | 1.8097 | 3.124 | 0.629 | 1.623 |

Figure 11A:
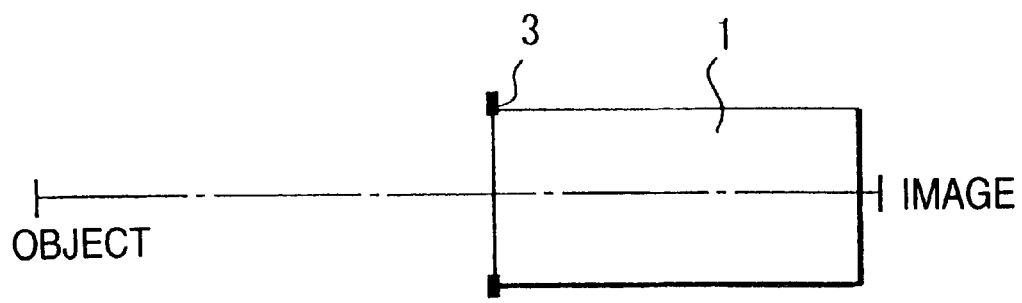
FIG. 11 illustrates the lens configuration of Comparative Example 1 and the on-axis aberrations it develops.
Figure 11B:
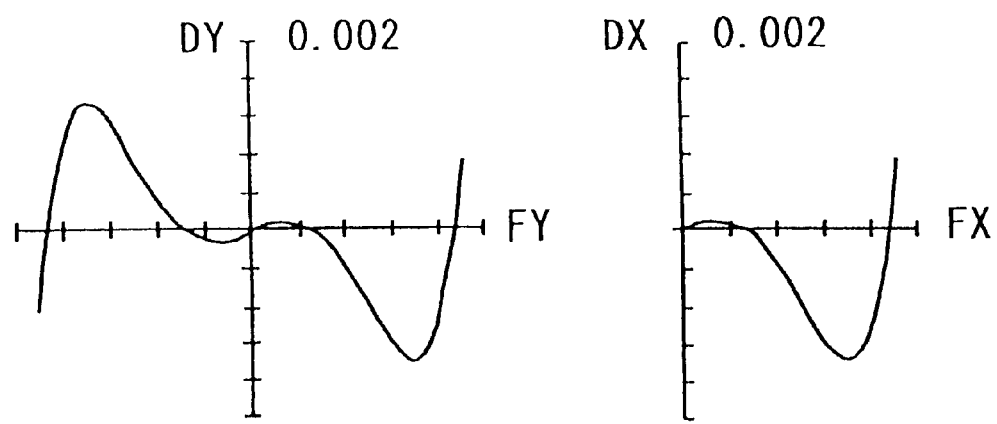
Figure 12A:
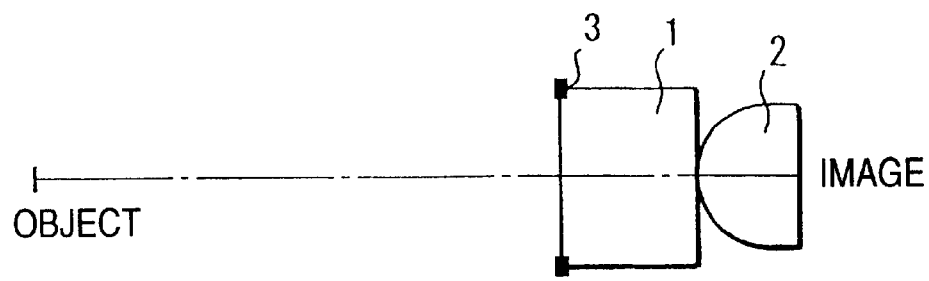
FIG. 12 illustrates the lens configuration of Comparative Example 2 and the on-axis aberrations it develops.
Figure 12B:
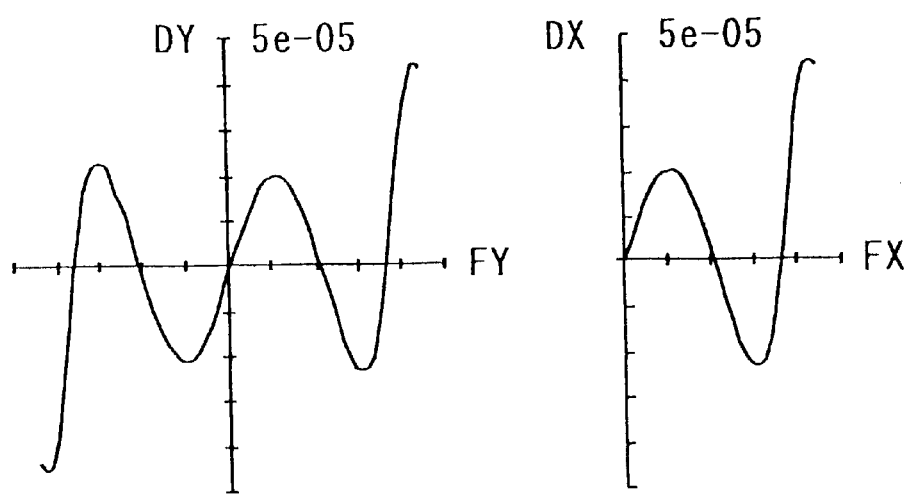

FIGS. 1–10 correspond to Examples 1–10 and FIGS. 11 and 12 correspond to Comparative Examples 1 and 2, respectively. Comparative Example 1 is the case of using only a gradient index lens and Comparative Example 2 shows the case where NA on image side has the largest value among all examples of commonly assigned Japanese Patent Application No. 203244/1998. In each figure, block A represents the lens configuration and block B the on-axis aberrations. In block A, numeral 1 signifies the gradient index lens, 2 the planoconvex lens, and 3 the aperture diaphragm. In block B, DY and DX represent lateral aberrations in tangential and sagittal directions, respectively (with $r_0$ being taken as unity). FX and FY represent the distance between the incident light and the optical axis at the diaphragm's position, with the terminal end of each defining the radius of the aperture.

Tables 2–4 show that the value of NA on image side which is 0.629 in Comparative Example 1 and 1.623 in Comparative Example 2 can be increased to about 1.7 and more by adopting the design of the present invention. Particularly high values ($\geq 2.1$) can be achieved in Examples 2–6 and 10.

In all of the examples described above, the aperture diaphragm is positioned on the object side of the gradient index lens. However, this is not the sole case of the invention which utilizes only the image formed near the optical axis and the aperture diaphragm may be positioned either between the gradient index lens and the planoconvex lens or on the image side of the latter. Alternatively, the aperture diaphragm may be a frame part formed integral with the lens holder or some other member.

As described on the foregoing pages, the optics of the invention is characterized in that a gradient index lens and a planoconvex lens made of a high-index material are combined in such a way that the convex surface of the latter is directed toward the former. The optics used as an objective lens has an adequately increased NA value without suffering from increased aberrations. In addition, it has a sufficiently small diameter and size to meet the need for realizing high-density recording on optical recording media. As a further advantage, the optics can be manufactured at low cost.

In addition, as described in Japanese patent application No. Hei. 10-328022, in a case where a lens is made up of a combination of a single planoconvex lens having a homogeneous refractive index and a single gradient index lens having a gradient refractive index in a radial direction thereof, in which:

(1) an object plane, the planoconvex lens, the gradient index lens and an image plane are arranged in that order along an optical axis;

(2) both surfaces of the gradient index lens are planar and its gradient refractive index is expressed as $$n(r)^2 = n_0^2 \cdot \{1-(g \cdot r)^2 + h_4(g \cdot r)^4 + h_6(g \cdot r)^6 + h_8(g \cdot r)^8 + \ldots\}$$

where
$1.45 \leq n_0 \leq 1.90$
$0.45 \leq n_0 \cdot g \cdot r_0 \leq 0.90$
provided that
r: a distance from the optical axis
n(r): a refractive index at distance r from the optical axis
$n_0$: a refractive index on the optical axis
$r_0$: an effective radius of the gradient index lens
g: a 2nd order gradient index coefficient
$h_4, h_6, h_8, \ldots$ : a higher order gradient index coefficient (3) the planoconvex lens has its convex surface positioned toward the gradient index lens and its planar surface positioned toward an object, with its refractive index n and radius of curvature R of the convex surface satisfying $$1.45 \leq n \leq 4.00$$

$$0.8r_0 \leq R \leq 3.0r_0$$

and the image plane being positioned either at or near one of the planar surfaces of the gradient index lens, such a lens can be suitably used also as an endoscopic objective lens.

What is claimed is:

1. Optics using a gradient index lens comprising the combination of a single gradient index lens having a gradient refractive index in a radial direction thereof and a single planoconvex lens having a homogeneous refractive index, (1) the gradient index lens having a planar or convexo-spherical lens surface;

(2) the planoconvex lens being opposed to the gradient index lens such that its optical axis aligns with the optical axis of the gradient index lens and that it satisfies the following condition:

$$2.2 < n$$

where n: the refractive index of the planoconvex lens.

2. The optics according to claim 1, wherein the gradient refractive index of the gradient index lens is expressed as $$n(r)^2 = n_0^2 \cdot \{1-(g \cdot r)^2 + h_4(g \cdot r)^4 + h_6(g \cdot r)^6 + h_8(g \cdot r)^8 + \ldots\}$$

where
$1.45 \leq n_0 \leq 1.80$
$0.45 \leq n_0 \cdot g \cdot r_0 \leq 0.90$
provided that
r: the distance from the optical axis
n(r): the refractive index at distance r from the optical axis
$n_0$: the refractive index on the optical axis
$r_0$: the radius of the gradient index lens
g: the second order gradient index coefficient
$h_4, h_6, h_8, \ldots$ : a higher order gradient index coefficient.

3. The optics according to claim 2, wherein the refractive index n of the planoconvex lens is within the range of $2.2 < n \leq 4.2$, the gradient index lens satisfies $0.45 \leq n_0 \cdot g \cdot r_0 \leq 0.70$, and the convex surface of the planoconvex lens is spherical and satisfies $0.2r_0 \leq R \leq 1.0r_0$, where R is the radius of curvature of the convex surface of the planoconvex lens.

4. Objective lens optics according to claim 1, which is built in an optical head in such a way that one of the two lens surfaces of the gradient index lens is opposed to the convex surface of the planoconvex lens, that the other lens surface of the gradient index lens is opposed to a light source and that the planar surface of the planoconvex lens is opposed to a recording medium.

5. Objective lens optics according to claim 2, which is built in an optical head in such a way that one of the two lens surfaces of the gradient index lens is opposed to the convex surface of the planoconvex lens, that the other lens surface of the gradient index lens is opposed to a light source and that the planar surface of the planoconvex lens is opposed to a recording medium.

6. Objective lens optics according to claim 3, which is built in an optical head in such a way that one of the two lens surfaces of the gradient index lens is opposed to the convex surface of the planoconvex lens, that the other lens surface of the gradient index lens is opposed to a light source and that the planar surface of the planoconvex lens is opposed to a recording medium.

7. Objective lens optics according to claim 4, wherein focal position on the image side substantially coincides with the planar surface of the planoconvex lens.

8. Objective lens optics according to claim 5, wherein focal position on the image side substantially coincides with the planar surface of the planoconvex lens.

9. Objective lens optics according to claim 6, wherein focal position on the image side substantially coincides with the planar surface of the planoconvex lens.

* * * * *